Figure 4:
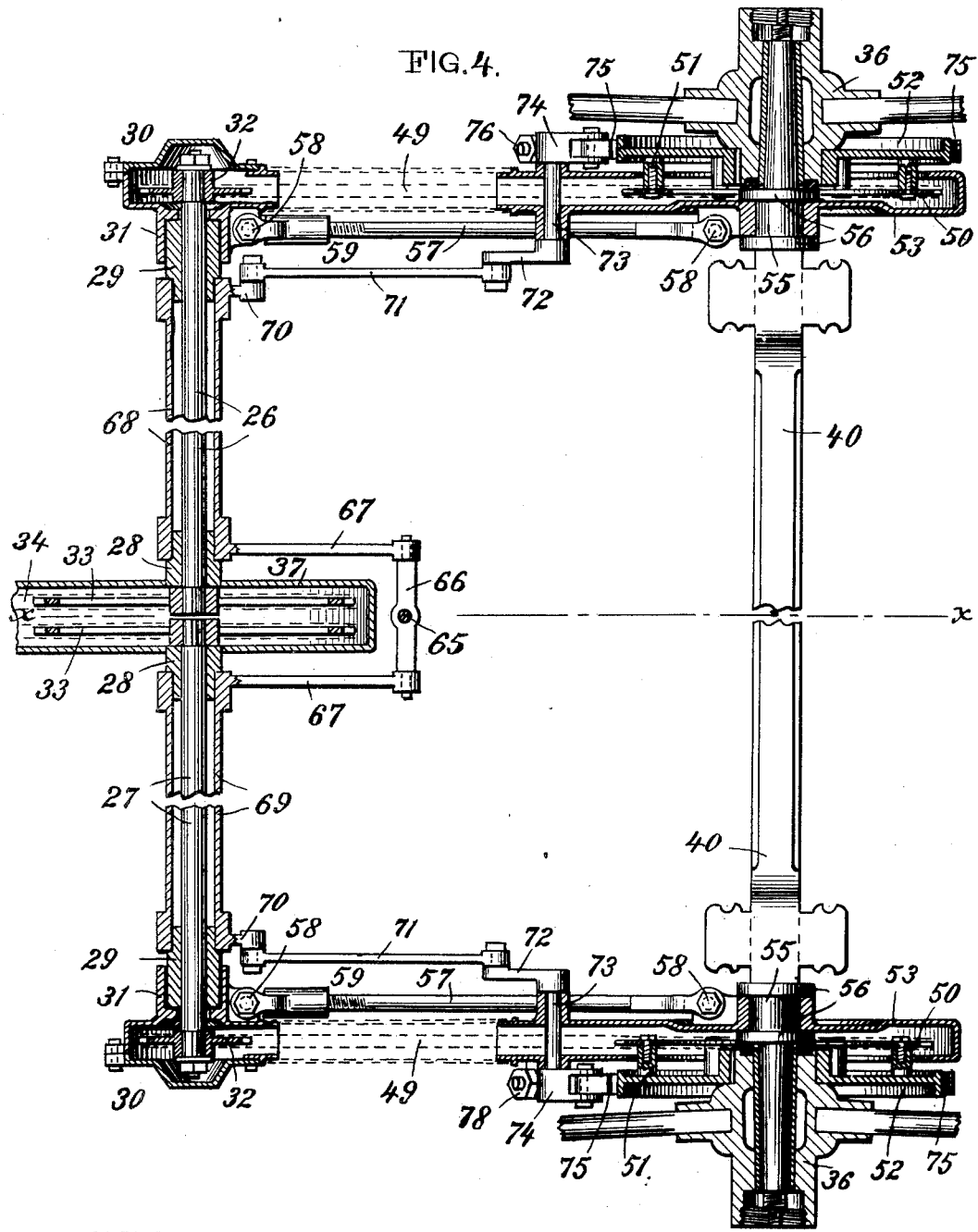

No. 675,531. Patented June 4, 1901.
A. L. STEVENS.
MOTOR VEHICLE.
(Application filed Aug. 22, 1900.)

(No Model.) 8 Sheets—Sheet 1.

FIG. 1.

WITNESSES:
Kenneth H. Slocum.
A. J. Doty

INVENTOR
Arthur L. Stevens,
BY
Alvin K. Goodwin,
ATTORNEY

THE NORRIS PETERS CO., PHOTO-LITHO., WASHINGTON, D. C.

No. 675,531. Patented June 4, 1901.
A. L. STEVENS.
MOTOR VEHICLE.
(Application filed Aug. 22, 1900.)
(No Model.) 8 Sheets—Sheet 2.
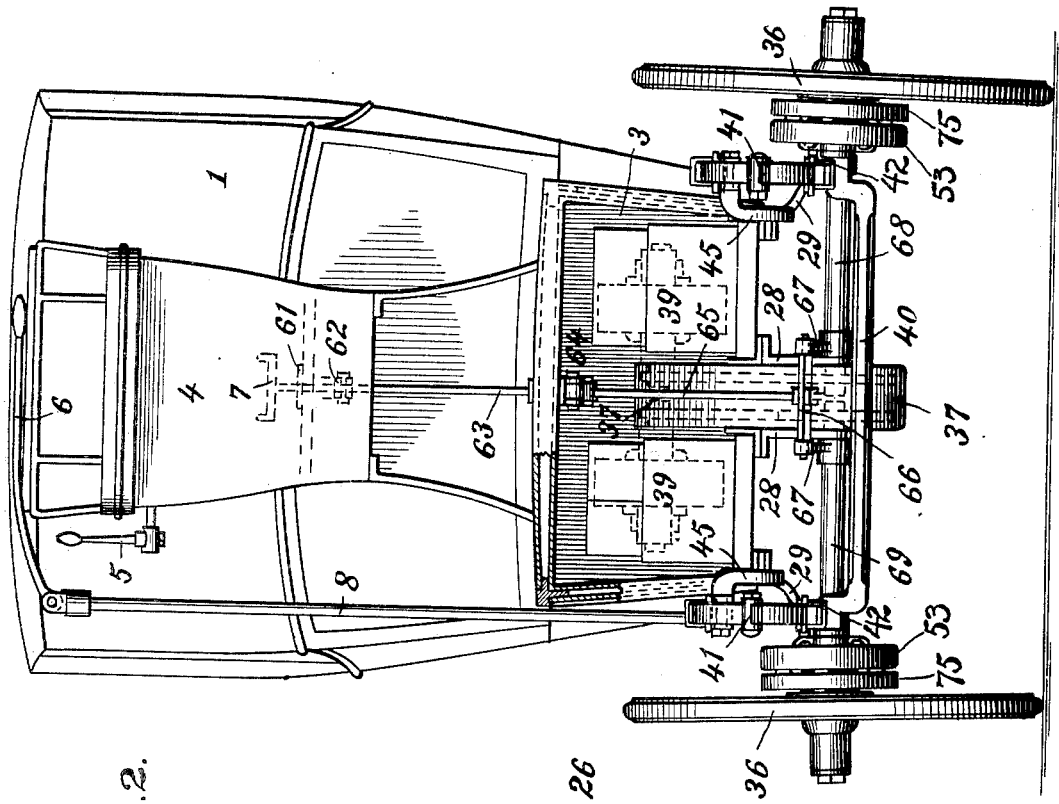
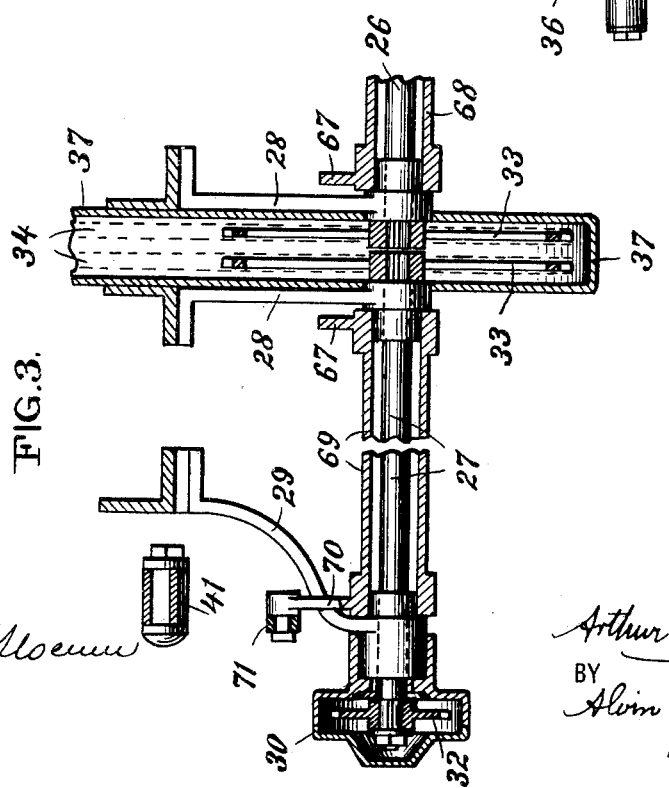
WITNESSES:
Kenneth H. Slocum
A. J. Doty
INVENTOR
Arthur L. Stevens,
BY
Alvin K. Goodwin,
ATTORNEY No. 675,531.  
A. L. STEVENS.  
MOTOR VEHICLE.  
(Application filed Aug. 22, 1900.)  
Patented June 4, 1901.  
(No Model.)  
8 Sheets—Sheet 3.

No. 675,531. Patented June 4, 1901.
A. L. STEVENS.
MOTOR VEHICLE.
(Application filed Aug. 22, 1900.)
(No Model.) 8 Sheets—Sheet 4.
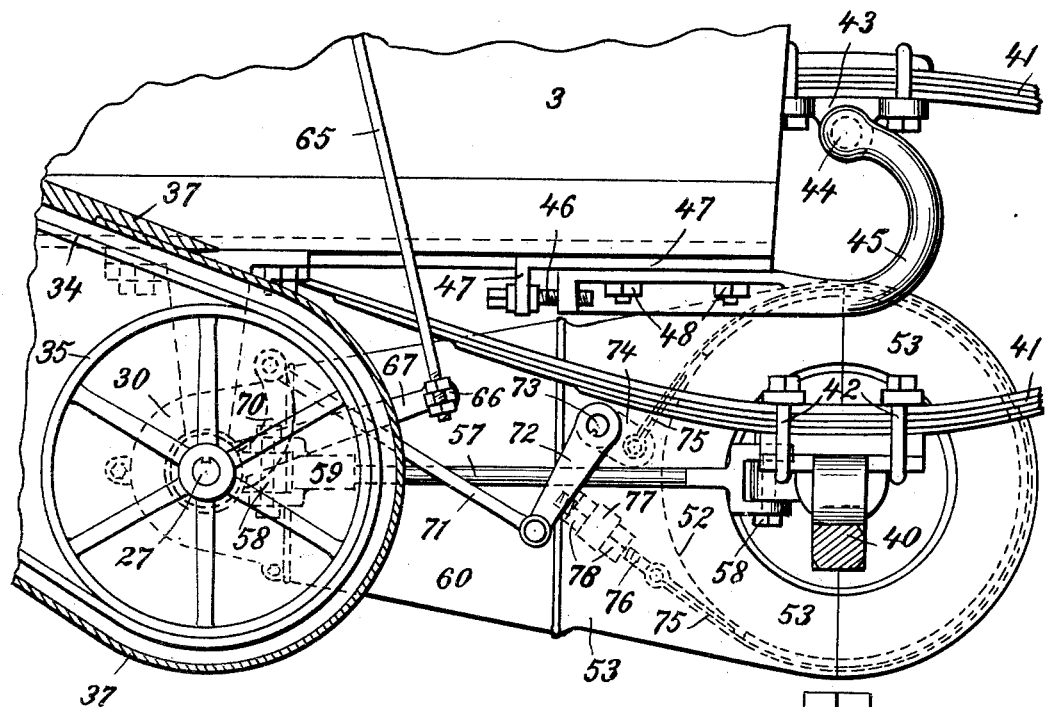
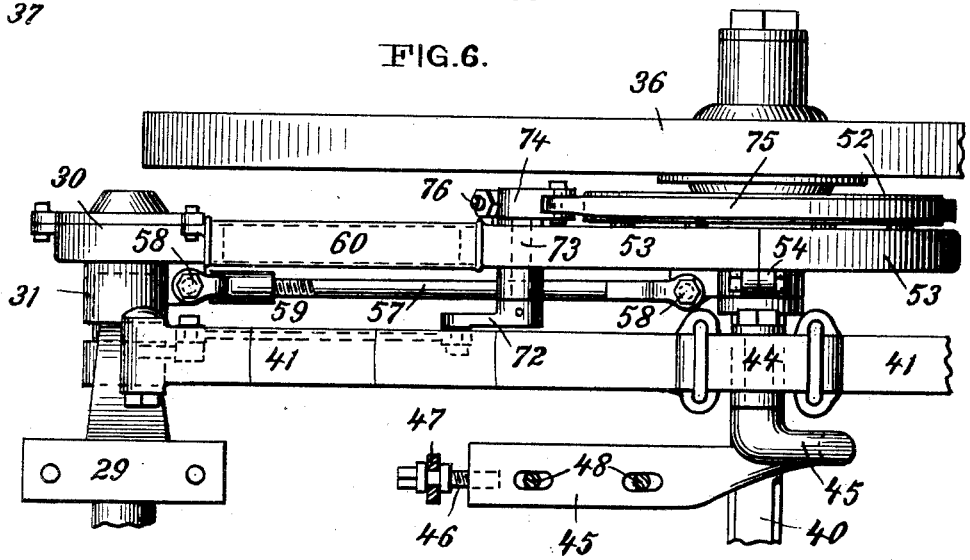
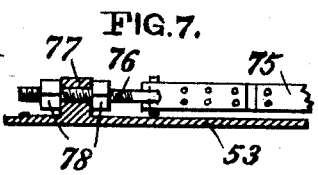
WITNESSES: INVENTOR
Arthur L. Stevens,
BY
Alvin K. Goodwin,
ATTORNEY No. 675,531. Patented June 4, 1901.
A. L. STEVENS.
MOTOR VEHICLE.
(Application filed Aug. 22, 1900.)
(No Model.) 8 Sheets—Sheet 5.

WITNESSES:
INVENTOR
Arthur L. Stevens,
BY
Alvin K. Goodwin,
ATTORNEY.

No. 675,531. Patented June 4, 1901.
A. L. STEVENS.
MOTOR VEHICLE.
(Application filed Aug. 22, 1900.)
(No Model.) 8 Sheets—Sheet 5.

WITNESSES:

INVENTOR
Arthur L. Stevens,
BY
Alvin K. Goodwin,
ATTORNEY.

No. 675,531. Patented June 4, 1901.
A. L. STEVENS.
MOTOR VEHICLE.
(Application filed Aug. 22, 1900.)
(No Model.) 8 Sheets—Sheet 6.

WITNESSES:
INVENTOR
Arthur L. Stevens,
BY Alvin K. Goodwin,
ATTORNEY

No. 675,531. Patented June 4, 1901.
A. L. STEVENS.
MOTOR VEHICLE.
(Application filed Aug. 22, 1900.)
(No Model.) 8 Sheets—Sheet 7.
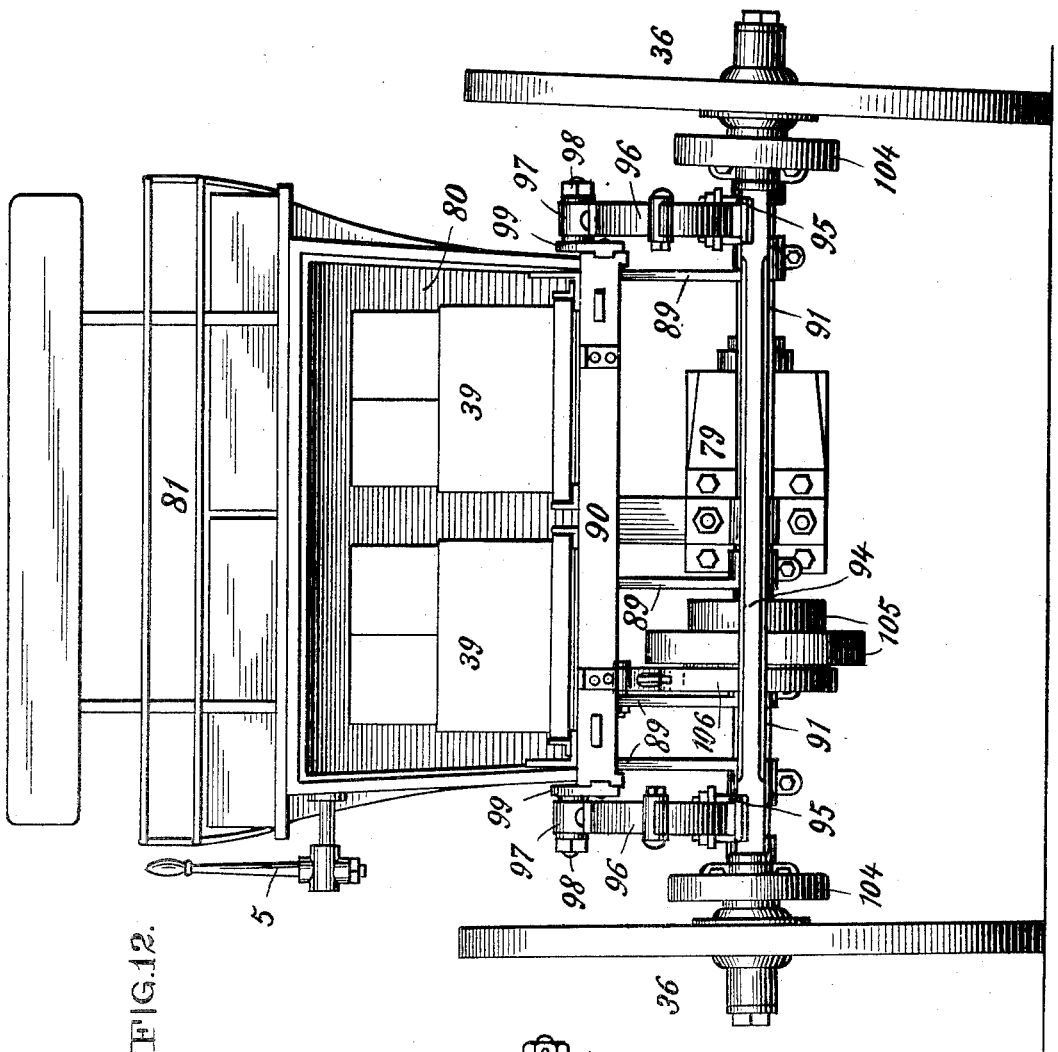
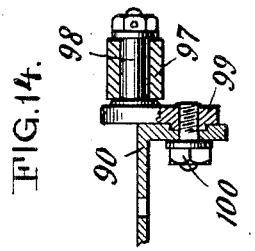
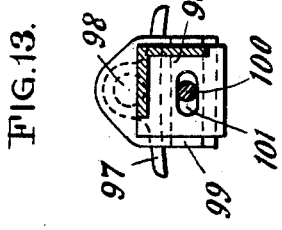
WITNESSES:
INVENTOR
Arthur L. Stevens,
BY
Alvin K. Goodwin,
ATTORNEY No. 675,531. Patented June 4, 1901.
A. L. STEVENS.
MOTOR VEHICLE.
(Application filed Aug. 22, 1900.)
(No Model.) 8 Sheets—Sheet 8.

WITNESSES:
Kenneth H. Slocum
A. J. Doty

INVENTOR
Arthur L. Stevens,
BY
Alvin K. Goodwin
ATTORNEY

THE NORRIS PETERS CO., PHOTO-LITHO., WASHINGTON, D. C.

UNITED STATES PATENT OFFICE.

ARTHUR L. STEVENS, OF NEW YORK, N. Y.

MOTOR-VEHICLE.

SPECIFICATION forming part of Letters Patent No. 675,531, dated June 4, 1901.

Application filed August 22, 1900. Serial No. 27,649. (No model.)

*To all whom it may concern:*

Be it known that I, ARTHUR L. STEVENS, a citizen of the United States of America, residing at the borough of Manhattan, city of New York, State of New York, have invented certain new and useful Improvements in Motor-Vehicles, of which the following is a specification.

One important object of this invention is to provide for motor-vehicles a simple, compact, efficient, and durable driving mechanism which is universally self-adjusting relatively to vertical or lateral movements or varying positions of the vehicle-body or of its driving-wheels on rough or undulating or sidewise-slanting roads.

Another object of the invention is to arrange for readily taking up wear of the driving mechanism, while providing also for readjustment of the adjacent mountings of the vehicle-body on its springs and axle to maintain normal and easy elastic action of the springs.

Another object of the invention is to provide a novel and efficient brake mechanism specially combined with the driving mechanism, so as not to interfere with its universal or wear-compensating adjustments.

A further object of the invention is to relatively dispose the motors and their source of power and the driving and brake mechanisms in manner promoting the cleanliness, convenience, and most pleasing appearance of the vehicle.

The invention will first be described and then will be particularly defined in claims hereinafter set forth.

Reference is made to the accompanying drawings, forming part of this specification, and in which—

Figure 8:
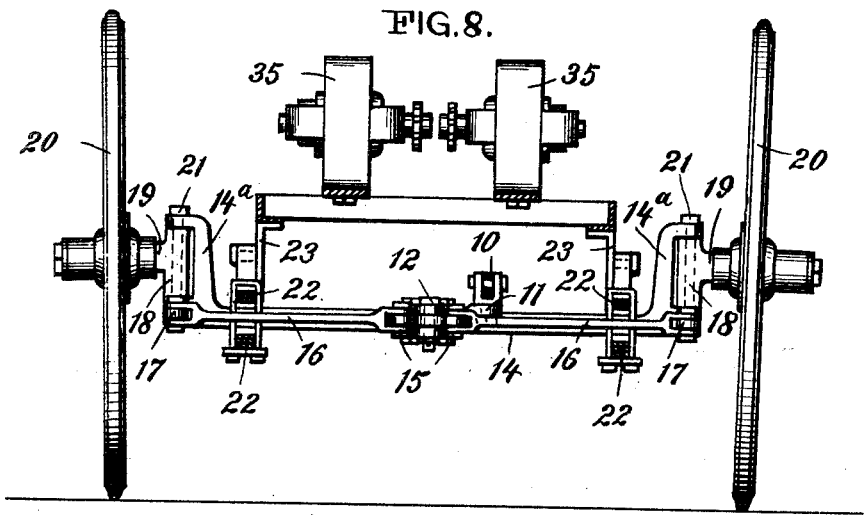
Figure 9:
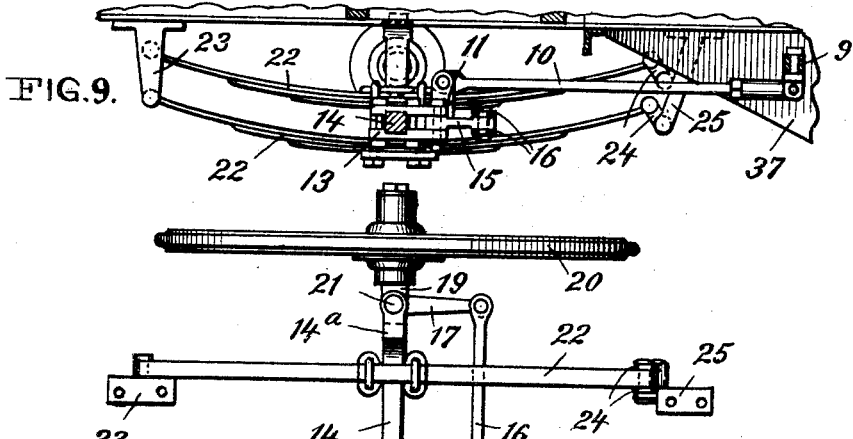
Figure 10:
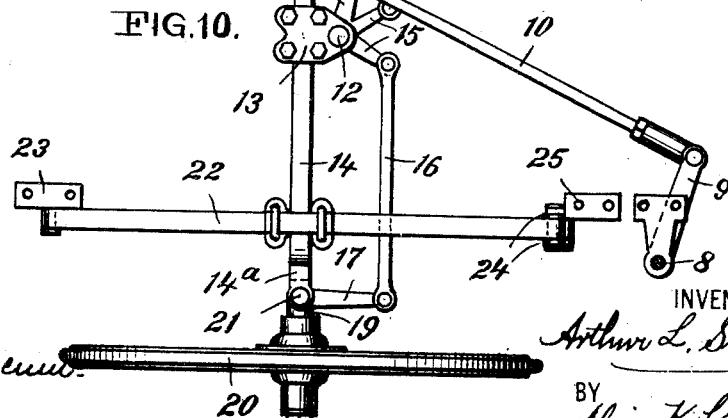
Figure 8:
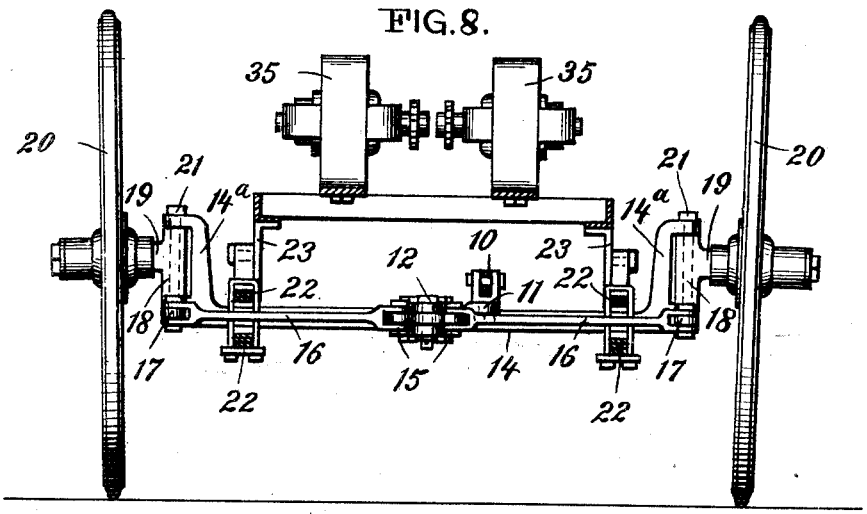
Figure 9:
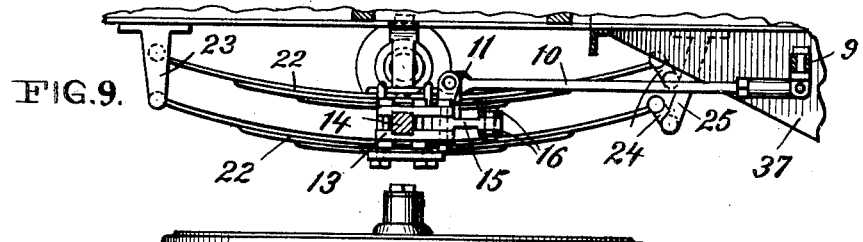
Figure 10:
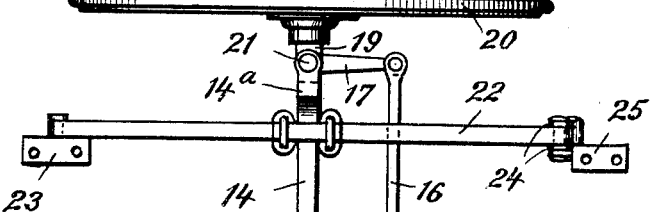
Figure 11:
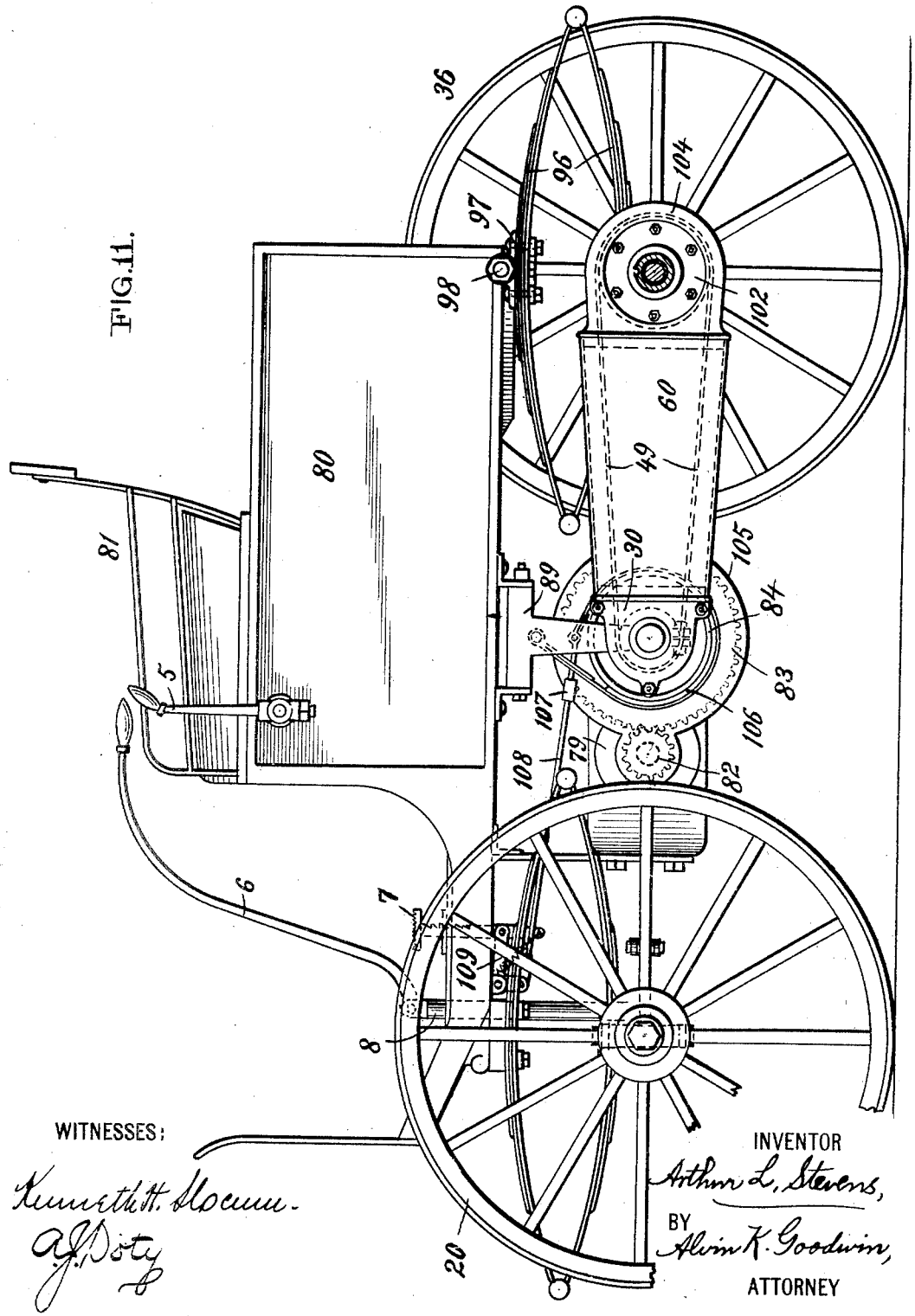
Figure 15:
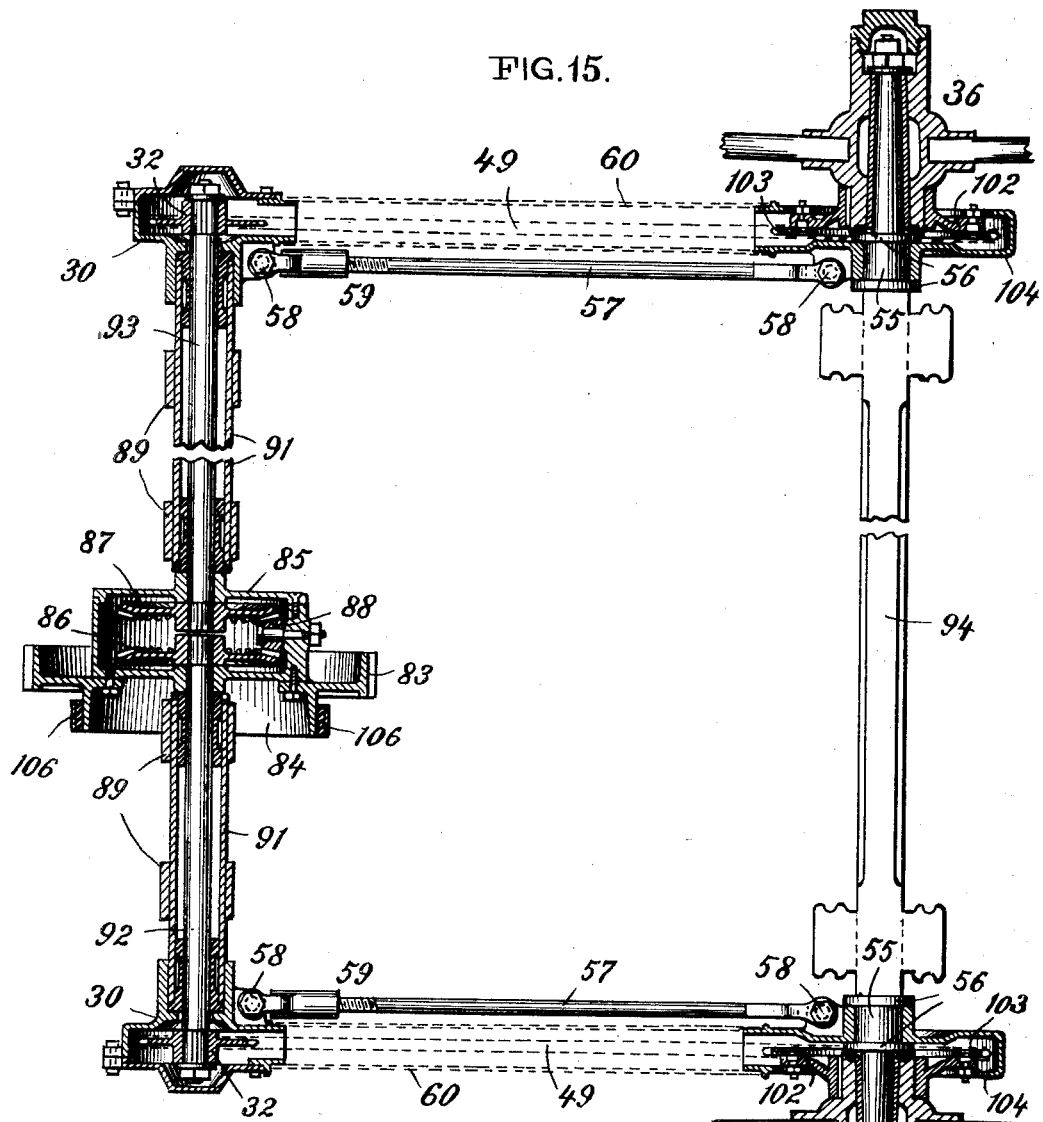
Figure 16:
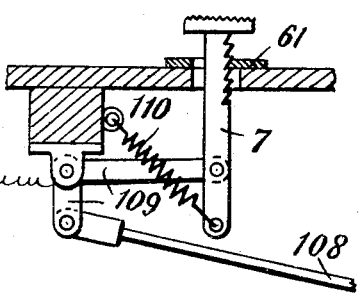

Figure 1 is a side elevation of a four-wheeled "hansom-vehicle" embodying my invention. Fig. 2 is a rear view thereof with the battery-box open and partly in section. Fig. 3 is an enlarged detail broken sectional view of parts of the driving-gearing. Fig. 4 is a broken sectional plan view illustrating the driving-gearing and brake mechanism. Fig. 5 is a central sectional side elevation taken on the line *x x* in Fig. 4. Fig. 6 is a plan view showing the driving and brake mechanisms at one side of the vehicle. Fig. 7 is a detail sectional plan view of a brake-band connection. Fig. 8 is a front sectional elevation of the forward running-gear, the steering mechanism, and the motors. Fig. 9 is a sectional side view more particularly showing the front wheels and axle, the duplex side springs, and the steering mechanism. Fig. 10 is a plan view of the front running-gear. Fig. 11 is a partly-broken side view of a "stanhope-vehicle" having an under-body motor and differential axle-gearing and equipped with my universally-adjusting driving-gearing. Fig. 12 is a rear view thereof with the battery-box open. Figs. 13 and 14 are sectional details of the adjustable body and spring connection of this vehicle. Fig. 15 is a sectional plan view of the stanhope driving-gearing, partly broken away; and Fig. 16 is a detail sectional side view of its brake-operating device.

I will describe my invention with reference more particularly to electrically-propelled vehicles; but in most features the invention is applicable to vehicles driven by any other power.

First, referring more particularly to Figs. 1 to 10 of the drawings, showing the hansom-vehicle, the numeral 1 indicates the front passenger-compartment, having a seat 2, in rear of which is the battery-compartment 3, preferably having double top and side walls, as shown in Fig. 2. Above compartment 3 is the driver's seat 4, from which he may conveniently operate the controller-lever 5, steering-lever 6, and brake-actuating bar 7. Lever 6 connects, by vertical rod 8, arm 9, and lengthwise-adjustable rod 10, with an arm 11 on a pivotal vertical shaft or stud 12, held by couplings 13 to the axle 14 of the front running-gear of the vehicle. Stud 12 also has two other arms 15, from which equalizing-rods 16 pass to arms 17, projecting one from each of the vertical axle-bearings 18. Each bearing 18 has a horizontally-projecting stub-axle 19, on which one of the front steering-wheels 20 is revolubly mounted. The opposite ends 14ᵃ of the front axle 14 are bent or project angularly and preferably upward from the main axle-body and carry lugs through which pass the vertical pivots 21 of axle-bearings 18, which support the wheels 20 and permit bodily horizontal swinging of them by the lever 6 and connections 8 to 17 for steering the vehicle. This relative arrangement of parts allows the vehicle-body to be set quite low down to permit easy entrance and exit of passengers and to increase the stability of the vehicle. The brake connections to foot-bar 7 will be hereinafter described. The body is sustained at each side from the front axle 14 by a series of superposed leaf-springs 22, preferably having an upward or double curve toward each end. Each spring 22 is pivoted at its front end directly to a pendent forging 23, bolted to the body bed or floor frame, and is pivoted at its rear end to and between a pair of links 24 24, in turn pivoted to a forging 25, bolted to the body bed-frame. The swinging of links 24 accommodates vertical play of the vehicle-body under varying loads on varying roads, as the springs 22 lengthen rearward from their front relatively stationary connections at 23. These curved and superposed and substantially parallel side springs are each lighter and more elastic than one heavier spring would be, and they therefore promote most comfortable riding, while giving a pleasing finish to the forward part of the vehicle. More than two of these springs 22 may be used; but I now deem two sufficient, and I prefer to clip them to top and bottom faces of the axle, as shown in the drawings. Furthermore, the use of these superposed side springs makes unnecessary the use of a long perch or reach between the front and rear axles of the vehicle. I propose to make a separate application to patent these duplex superposed side springs in combination with a vehicle body and axle, and especially as combined with a low cranked axle carrying pivoted stub-axles for the steering-wheels.
I make the main power-shaft of the driving-gearing in two parts 26 27, preferably in transverse alinement, and each journaled in fixed pendent hangers 28 29, strongly bolted to the body bed-frame. On the outer end of each shaft-section is placed a metal gear-casing 30, having a hub 31, which fits loosely but without play upon an outside boss of the hanger 29. These casings 30 are preferably made in two bolt-held parts and inclose pinions or chain-wheels 32, which are keyed to the outer ends of shafts 26 27. Each of these shafts carries at its inner end a larger chain-wheel 33, over which a belt or chain 34 passes forward to the driving-wheel of a motor 35.
There are two motors 35 35, preferably bolted to the body bed-frame and each independently rotating one of the two wheels 33, and thus rotating shafts 26 27 independently of each other and independently transmitting power by mechanism presently described to the two rear traction-wheels 36 of the vehicle. I thus dispense with differential axle-gearing while permitting varying speed of rotation of the two traction-wheels when turning the vehicle and providing ample driving power by using the two motors.

A casing 37, partly below and partly within the battery-compartment 3 of the vehicle-body, incloses the two gear-wheels 33 and the driving-belts 34 and communicates with a closed compartment 38, specially provided under the passenger's seat 2, to receive the two motors 35. Thus specially locating and incasing the motors and driving wheels and belts protects them from dust and dirt and from the acid-fumes of the storage battery, which, as shown, has two cell-boxes 39 39, which are located in body-compartment 3, one at each side of the upper part of belt-casing 37, as more clearly shown in Fig. 2 of the drawings. The top inclined rear portion of the driving-belt casing may be substituted by two close-fitting longitudinal partitions subdividing the battery-compartment to provide a separate side compartment for each battery-box and an intermediate separate compartment wide enough to receive the power-transmitting wheels and belts. Suitable leads (not shown) connect the battery with the motors 35 through the ordinary current-controller operated by the handle 5 to supply power for driving the vehicle. I specially mention the above arrangement of the inclosed or incased motors and primary driving-gearing relatively to the passenger's seat and battery-compartment and battery, because it allows me to set the body low down to increase the general stability and safety of the vehicle and promote its easy running and the most convenient entrance and exit of passengers. This relative arrangement of the vehicle-body, motors, battery, and primary driving-gearing also has special utility in that it adds materially to the beauty of the general design of the vehicle and also provides for quick and thorough cleaning of all its parts. Furthermore, the motors are always directly accessible by simply swinging up or removing the passenger's seat 2. Another advantage of placing the electric motor or motors in a comparatively large compartment under the passenger's seat is that motors not having a closely-surrounding casing or weather-guard may be used, thus reducing the dead-weight of the motors and also giving a much more free circulation of air about them to keep them cooler and in much better condition than if they were closely incased and sustained below the vehicle-body in the usual way.

The traction-wheel axle 40 is preferably dropped a little at the center, and the wheels 36 rotate upon the higher end arms of this axle. The vehicle-body is supported from this axle 40 preferably by leaf-springs 41, held at central lower parts to the axle by clips 42 and held at central upper parts to the vehicle-body by a coupling having a plate 43, which has pivotal connection at 44 with a gooseneck forging 45, which is adjustable forward and backward on the body, and preferably by means of a screw 46, fitted in an angle-iron 47, fixed to the body-frame. Either of the parts 45 47 may be slotted for passage of bolts 48, which secure the gooseneck 45 at any position to which it may be adjusted by the screw 46. The objects of this pivotal and adjustable connection of the upper part of spring 41 to the vehicle-body are to allow free mutual rocking of the spring and body at pivot 44 during use of the vehicle and also to permit the upper part of the spring to be readjusted rearward by the screw 46 moving the gooseneck 45 to bring or hold the lengthwise centers of upper and lower parts of the spring in proper normal vertical alinement when or after the axle 40 and coupling 42 are moved rearward relatively to the vehicle-body and the chain-wheel 32 for taking up wear slack of a driving-chain 49, which connects wheel 32 with a larger chain-wheel 50, held to the traction-wheel 36. After taking up wear of this or any other suitable driving-gearing the spring 41 at each side of the vehicle thus may be readjusted at its connection with the vehicle-body to maintain the normal elastic action of the springs resulting from equable bearing of all parts of the spring-leaves upon each other.

The chain-wheel 50 is fixed, preferably by a series of bolts, to studs 51, projecting from the inner side of a friction brake member, which I herein show in the form of a wheel 52, firmly keyed to the hub of traction-wheel 36. I prefer to inclose the wheel 50 in a protecting metal casing 53, which is preferably made in two parts vertically joined in the central plane of the axle 40 and held together by bolts 54. The casing 53 extends forward far enough to provide journal-bearings for portions of the brake mechanism, as presently described. Casing 53 fits loosely but without play upon a bearing 55 of the axle and between two fixed collars 56 thereon, as best shown in Fig. 4 of the drawings. This casing 53 is coupled, preferably by a two-part swivel-jointed jack-bolt or reach-bar 57, to the front movable casing 30, which incloses driving-wheel 32, said coupling being effected by vertical pivots 58 58. These pivots permit free lateral movement of the vehicle-body and shafts 26 27 and of the traction-wheels 36 and their axle 40 relatively to each other without overstraining the casings or other parts. The swivel connections at 59 between the two parts of the reach-bars 57 allow the adjacent traction-wheels 36 to mount any obstruction or lateral incline of the road and throw the axle 40 out of level without overstraining the casings 30 53 or the reach-bars 57, as these bars then simply turn more or less at their swivel-joints 59.

If no provision were made for the above-described rearward adjustment of the traction-wheels and axle to take up wear of the driving-chains 49, the reach-bar joint at 59 could be any kind of a swivel connection; but to accommodate said wear-compensating adjustment I make said swivel-joint so as also to permit lengthening of the reach-bar. I prefer to make the compound swivel-joint by threading the end of one part of bar 57 and fitting said thread into a nut on the other part of the bar, as more clearly shown in Figs. 4 and 6 of the drawings. To effect wear-compensating adjustment, the bar 57 will first be uncoupled at one end by removing pivot-bolt 58, and after the wheels 36 and axle 40 are set back by screws 46 (or the body moved relatively forward) sufficiently to take up slack of the driving-chain 49 the bar 57 is lengthened by turning the swivel-thread in its nut until the holes for the removed bolt 58 again match and permit recoupling to the driving-wheel casing. After this chain adjustment is effected the bolts 48 will be loosened and the screws 46 will be operated to rearwardly adjust the upper halves of the springs 41, as hereinbefore described.

While the reach-bar pivots 58 permit free relative lateral movement of the vehicle-body and traction-wheels and axle and the bar swivel-joints 59 permit free irregular vertical relative movements of the traction-wheels, as above described, the free turning of the gear-casings 30 53 on their bearings at 29 55 while connected by swivel reach-bars 57 facilitates all such movements, while providing in simple manner for taking up wear or stretch of the chain belts 49 without sacrificing the strength or efficiency of the mechanism. The bars 57 and gear-casings 30 53 at opposite sides of the running-gear constitute a substantial double reach coupling the rear axle and traction-wheels to the bearings of the driving-shafts 26 27 and causing all these parts to mutually brace each other to assure the safety and durability of the vehicle. The metal gear-casings 30 53 are connected by a suitable dust and weather guard 60, which incloses and protects intermediate portions of the driving-chain. The guard 60 preferably has end slots receiving screw-fastenings at the casings 30 53 to accommodate adjustment of the mechanism for taking up slack of the driving-chain.

The notched brake-operating rod 7 works through the usual slotted latch-plate 61 and is pivoted to one end of a lever 62, with which couples a rod 63, pivoted below to a guiding rocking arm 64, fulcrumed at the top of battery-compartment 3. A rod 65, coupled to arm 64, also couples with a cross-head 66, to which are attached the extremities of two levers 67 67, fixed to two sleeves 68 69, which surround the driving-shafts 26 27 and are journaled upon bosses of the shaft-bearings 28 29. Each sleeve carries a fixed arm 70, to which is coupled a rod 71, in turn coupled to a crank-arm 72, fixed to a short transverse shaft 73, journaled in opposite side walls of the forward extension of the rear driving-gear casing 53. Each shaft 73 carries at its outer end a fixed arm 74, to which is coupled one end of a brake-band 75, which nearly surrounds the flanged periphery of brake-wheel 52, fixed to traction-wheel 36. The other relatively-fixed end of the brake-band has a slotted eye receiving the headed end of a screw-rod 76, which is fitted in a threadednut projection 77, formed on or fixed to the outer face of the outside wall of gear-casing 53. Two nuts 78 on screw-rod 76 provide for nice operative adjustment of the brake-band.

When brake-rod 7 is depressed by the driver's foot, the rods 63 65 will be raised, thus rocking the sleeves 68 69 on the driving-shaft bearings 28 29 and operating parts 70 to 74 to draw the brake-bands 75 simultaneously to the brake-wheels 52 on both traction-wheels 36 to apply the brake to any desired extent. When the rod 7 is released, the connections to the brake-bands will readjust themselves by gravity to normal positions and the bands 75 will by their own resiliency relax their hold upon the wheels 52 to release the brake. The adjustable connections 76 78 of the brake-bands to the relatively stationary gear-casings 53 not only permits taking up wear of the friction brake-surfaces and of the rod and lever connections, but it also provides for limitation of the brake-relaxing expansion of the bands 75, so that they normally have but slight clearance from the opposing brake-wheels 52 to avoid noisy contact therewith or with the casings 53, while assuring most prompt and effective application of the brake by a comparatively slight movement of the operating-rod 7 by the driver. The shafts 73 pass within the bights of the driving-chains 49 without interfering with the operation of either the chains or the brake, thereby permitting location of the brake wheels and bands of the traction-wheels 36 outside of the driving-gear casings 53 and allowing operation of the brake from the shaft-arms 72 and parts 66 to 71 from one centrally-disposed rod 65, actuated from foot-bar 7, as above described. This arrangement promotes the compactness and efficiency of the entire mechanism. As each sleeve 68 69 may rock independently on its bearings 28 29, the brake will be applied with equal force to both of the traction-wheels 36 to most quickly and effectively stop the vehicle in an emergency or to regulate its downgrade speed without causing wabbling of the vehicle on the road.

I now will refer to Figs. 11 to 16 of the drawings, showing a stanhope-vehicle, which has substantially similar universally-adjustable chain-driving gearing as the hansom, but is propelled by a single under-body electric motor 79, which is adapted for operation by current from a storage battery 39 in the body-compartment 80 under the driver's seat 81 and is regulated by a suitable current-controller operated by lever 5. The steering-handle 6 connects by vertical shaft 8 and interposed mechanism with arms on pivoted stud-axles, permitting bodily horizontal movement of the front wheels 20 for steering purposes, substantially as in the hansom-cab.

The pinion 82 of motor 79 engages a large gear-wheel 83, having a brake-rim 84 and bolted to a casing 85, containing two large bevel gear-wheels 86 87, with interposed series of bevel-pinions 88, comprising the well-known differential gearing. In hangers 89, pendent from the body-frame 90, are fixedly supported two sleeves or tubes 91 91, containing end bushings in which are journaled two alined driving-shafts 92 93, carrying the differential gears 86 87. The outer ends of shafts 92 93 have chain-wheels 32, inclosed in casings 30, which may rock on the fixed sleeves 91.

The traction-wheels 36 are on the rear axle 94, to which are held by clips 95 the elliptical side springs 96. These springs each carry at the top a metal plate or block 97, having a pivotal connection at 98 with a slide 99, adjustably held to the body-frame 90 by bolts 100. A slot 101 in either part 90 or 99 permits rearward readjustment of upper halves of springs 96 after taking up wear of the driving-chains 49.

To the hub of each traction-wheel 36 is fixed a disk 102, to which is bolted a chain-wheel rim 103, from which a driving-chain 49 passes forward to the corresponding chain-wheel 32. A casing 104, hung on an axle-bearing 55 between collars 56 56, forms, together with the rotary disk 102, a dust-guard for wheel 103 and chain 49. The casings 30 104 at each side of the vehicle are connected by reach-bars 57 at vertical pivots 58. The bars 57 preferably have the adjustable swivel-joint 59. These reach-bars permit self-adjustment of the rear wheels 36 to varying levels of road-surface without overstraining any part of the mechanism and also permit taking up slack wear of the driving-chains 49, substantially as above described for like reach-bars 57 of the hansom-vehicle. An intermediate dust-guard 60 between casings 30 104 completes protection of the wheel and chain gearing. A casing 105 preferably surrounds and protects the motor-gears 82 83 and the differential gearing 85 to 88. The brake-band 106 of this vehicle is held at one end to one of the driving-gear hangers 89 and after passing around the brake-rim 84 on gear 83 is adjustably connected at 107 to a rod 108, coupled to the short arm of an elbow-lever 109. This lever is fulcrumed to the body-floor and is pivoted to the lower end of a brake-bar 7, operative by the driver's foot and adapted to a latch-plate 61 on the floor. A spring 110 normally engages a notch of bar 7 with the latch-plate to hold the brake mechanism at any desired adjustment.

It is obvious that my improved universally-adjustable driving-gearing may be used on various styles of vehicles having varying means for applying the motor-power to the traction-wheels. The stanhope, having the differential gearing 86 87 88, driven by one motor and permitting varying speed of rotation of the opposite traction-wheels when turning the vehicle, is shown merely as another example of the wide adaptability of my invention.

The drawings represent the most complete preferred construction; but it will be understood that the various operative principles of my invention may be embodied in other and modified structures or vehicles. For instance, it is not essential that chain-wheels be used to rotate the traction-wheels from the driving-shafts, as other gearing may be employed for this purpose, while retaining the relative arrangement of the motors 35 under the passenger's seat and the casing 37 partly below and partly in the battery-compartment and inclosing the driving-gearing to promote cleanliness and give the neat appearance and finish specially useful in vehicles of this class. Furthermore, it is not essential that the reach-bars connecting revoluble parts on the traction-wheel axle and driving-shaft be made with a swivel, provided they be coupled to said revoluble parts by vertical pivots permitting free lateral and vertical movements of the traction-wheels relatively to the driving-shafts and to the vehicle-body. Swivel-jointing the reach-bars is a further improvement, adding to the last-named functions that of self-adjustment of the traction-wheels to varying road-levels, and the further improvement of making the reach-bars adjustable lengthwise permits wear-compensating adjustment of any kind of driving-gearing rotating the traction wheel or wheels from the driving shaft or shafts. The chain-belt-driving gearing is both simple and reliable and is especially desirable when inclosed to exclude dust and dirt. Hence my preferred plan of coupling the reach-bars to the chain-wheel casings, fitted revolubly at the traction-wheel axle and driving-shafts. Furthermore, the springs at the traction-wheel axle may have different form and still have the adjustable pivotal connection with the vehicle-body, and the particular form of the brake members at the traction wheel or wheels is immaterial, provided that the incased driving-wheel is fixed to the traction-wheel inside of the brake member on said wheel and that the other brake member is operated from a shaft journaled in the driving-wheel casing and having inner connections to any device controlled by the driver.

The pivotal connection at 44 or 98 of intermediate parts of upper portions of the vehicle-springs may be supplemented by pivotal connection of intermediate parts of their lower portions to the traction-wheel axle. In either case the permitted bodily-rocking movement of the springs at their intermediate pivots has special relation to the connection of the reach-bars to parts which are loose on the driving-shaft and traction-wheel axle, as these pivotal connections allow the entire springs, no matter how heavily they may be loaded, to rock bodily as the adjacent traction-wheels pass over obstructions and without bringing injurious endwise strains on the springs. When these pivotal connections of the springs are considered together with the reach-bars having swivel-joint and made lengthwise adjustable and also coupled to the loose parts on the traction-wheel axle and the driving-shaft by vertical pivots, it will be seen that every necessary provision is made for full protection of the springs from overstraining endwise, while a practically universal adjustment of the traction-wheels relative to the vehicle-body and to any variation of road-levels and to the driving-gearing is permitted, and ample provision also is made for wear-compensating adjustment of the driving mechanism.

I am aware of a prior-patented vehicle in which there is a lengthwise-adjustable distance-rod coupled at opposite ends by universally-movable connections to a casing surrounding the traction-wheel axle and to the driving-shaft of a motor which has free fore-and-aft movement upon the vehicle-body. This distance-rod serves mainly as a means for occasionally taking up the wear and stretch of the driving chain belt. The stress of propelling the vehicle is taken mainly by brace-rods, which directly and rigidly connect the traction-wheel-axle casing and the vehicle-body and necessarily limit relative freedom of movement of said traction-wheels and body. It also is quite impossible for the above-named distance-rod to bear the strains incident to propelling the vehicle. In my invention the reach-bars 57 by their connection to parts which are loose on the traction-wheel axle and on a driving-shaft fixed to the vehicle body take practically all the stress or strains of propelling the vehicle, while entirely relieving the motor of such strains, and also making the ordinary reach between front and rear axles unnecessary, and there are no rigid braces between the traction-wheel axle and the vehicle-body. Relative freedom of movement of the traction-wheels and body of my vehicle within the range of elastic yielding of the body-supporting springs is therefore assured, while the driving mechanism also has free range of adjustment to accommodate any relative positions of the vehicle-body and the traction-wheels. I may use but one centrally-disposed reach-bar coupled to the traction-wheel axle and driving-shaft; but I prefer to use the two reach-bars arranged one at each side of the running-gear of the vehicle, substantially as above described.

I claim as my invention—

1. An automobile vehicle having in its body a motor-compartment, a motor or motors therein, and a compartment for the source of power of the motor, a driving-shaft below the vehicle body, driving means connecting said motor and shaft, and a casing for said driving means located partly in and partly below the source-of-power compartment.

2. An automobile vehicle having in its body compartments for the motors and the source of power supplying them, two driving-shafts below the vehicle-body, two motors in the motor-compartment, driving means independently connecting each of the motors to its own driving-shaft, means rotating the two traction-wheels independently from the two driving-shafts, and a casing for said independent driving means connecting the two motors and driving-shafts and located partly in and partly below the source-of-power compartment.

3. An electric automobile vehicle having motor and battery compartments in its body, a driving-shaft below the vehicle-body, a motor in the motor-compartment, driving means connecting said motor and shaft, and a casing for said driving means located partly in and partly below the battery-compartment.

4. An electric automobile vehicle having motor and battery compartments in its body, two driving-shafts below the vehicle-body, two motors in the motor-compartment, driving means independently connecting each of the motors to its own driving-shaft, means rotating the two traction-wheels independently from the two driving-shafts, and a casing for said independent driving means connecting the two motors and driving-shafts and located partly in and partly below the battery-compartment.

5. An electric automobile vehicle having motor and battery compartments in its body, two driving-shafts below the vehicle-body, two motors in the motor-compartment, two battery-cell boxes in the battery-compartment, driving means independently connecting each of the motors to its own driving-shaft, means rotating the two traction-wheels independently from the two driving-shafts, and a casing for said independent driving means connecting the two motors and driving-shafts and located partly below and partly in the battery-compartment and between the two battery-cell boxes.

6. In a motor-vehicle, the combination, with the traction-wheel axle, a driving-shaft mounted in bearings fixed to the vehicle-body, and means rotating the traction-wheel from said shaft, of parts revolubly fitted at said axle and shaft, and a reach-bar coupled to said revoluble parts by vertical pivots and permitting free vertical and lateral movements of the traction-wheel relatively to the driving-shaft and vehicle-body.

7. In a motor-vehicle, the combination, with the traction-wheel axle, a driving-shaft mounted in bearings fixed to the vehicle-body, and means rotating the traction-wheel from said shaft, of parts revolubly fitted at said axle and shaft, and a swivel-jointed reach-bar coupled to said revoluble parts by vertical pivots and permitting universal movements of the traction-wheel relatively to the driving-shaft, the vehicle-body and varying lateral road-levels.

8. In a motor-vehicle, the combination, with the traction-wheel axle, a driving-shaft mounted in bearings fixed to the vehicle-body, and means rotating the traction-wheel from said shaft, of parts revolubly fitted at said axle and shaft, and a lengthwise-adjustable reach-bar coupled to said revoluble parts by vertical pivots and permitting free vertical and lateral movements of the traction-wheel relatively to the driving-shaft and vehicle-body and also permitting wear-compensating adjustment of the traction-wheel-driving mechanism.

9. In a motor-vehicle, the combination, with the traction-wheel axle, a driving-shaft mounted in bearings fixed to the vehicle-body, and means rotating the traction-wheel from said shaft, of parts revolubly fitted at said axle and shaft, and a swivel-jointed and lengthwise-adjustable reach-bar coupled to said revoluble parts by vertical pivots and permitting universal movements of the traction-wheel relatively to the driving-shaft, the vehicle-body, and varying lateral road-levels, and also permitting wear-compensating adjustment of the traction-wheel-driving mechanism.

10. In a motor-vehicle, the combination, with the traction-wheel axle, two driving-shafts, and means independently rotating the two traction-wheels one from each driving-shaft, of parts revolubly fitted at said axle and at each driving-shaft, and two reach-bars coupled one at each side of the running-gear to said revoluble parts by vertical pivots and permitting free vertical and lateral movements of the traction-wheels relatively to their driving-shafts and to the vehicle-body.

11. In a motor-vehicle, the combination, with the traction-wheel axle, two driving-shafts, and means independently rotating the two traction-wheels one from each driving-shaft, of parts revolubly fitted at said axle and at each driving-shaft, and two swivel-jointed reach-bars coupled one at each side of the running-gear to said revoluble parts by vertical pivots and permitting universal movements of the traction-wheels relatively to their driving-shafts, the vehicle-body, and varying lateral road-levels.

12. In a motor-vehicle, the combination, with the traction-wheel axle, two driving-shafts, and means independently rotating the two traction-wheels one from each driving-shaft, of parts revolubly fitted at said axle and at each driving-shaft, and two swivel-jointed and lengthwise-adjustable reach-bars coupled one at each side of the running-gear to said revoluble parts by vertical pivots and permitting universal movements of the traction-wheels relatively to their driving-shafts, the vehicle-body, and varying lateral road-levels, and also permitting wear-compensating adjustment of the traction-wheel-driving mechanism.

13. In a motor-vehicle, the combination, with the traction-wheel axle, two driving-shafts, and means independently rotating the two traction-wheels one from each driving-shaft, of parts revolubly fitted at said axle and at each driving-shaft, and two swivel-jointed and lengthwise-adjustable reach-bars coupled one at each side of the running-gear to said revoluble parts by vertical pivots and permitting universal movements of the traction-wheels relatively to their driving-shafts, the vehicle-body, and varying lateral road-levels, and also permitting wear-compensating adjustment of the traction-wheel-driving mechanism.

14. In a motor-vehicle, the combination with the vehicle-body, the traction-wheel axle, springs connecting said body and axle and having pivotal couplings intermediate their ends on which they may rock bodily, a driving-shaft, and means rotating the traction-wheels from said shaft, of parts loosely fitted at said axle and shaft, and a swivel-jointed reach-bar connecting said loose parts and permitting independent vertical movements of the traction-wheel relatively to the driving-shaft and vehicle-body and to varying lateral road-levels without overstraining the body-supporting springs.

15. In a motor-vehicle, the combination, with the vehicle-body, the traction-wheel axle, springs connecting said body and axle and having pivotal couplings intermediate their ends on which they may rock bodily, a driving-shaft, and means rotating the traction-wheel from said driving-shaft, of parts loosely fitted at said axle and shaft, and a lengthwise-adjustable reach-bar connected to said loose parts and permitting free vertical movements of the traction-wheels relatively to the driving-shaft and vehicle-body without overstraining the body-supporting springs and also permitting wear-compensating adjustment of the traction-wheel-driving mechanism.

16. In a motor-vehicle, the combination, with the vehicle-body, the traction-wheel axle, springs connecting said body and axle and having pivotal couplings intermediate their ends on which they may rock bodily, a driving-shaft, and means rotating the traction-wheel from said shaft, of parts loosely fitted at said axle and shaft, and a swivel-jointed and lengthwise-adjustable reach-bar connected to said loose parts and permitting independent vertical movements of the opposite traction-wheels relatively to the driving-shaft and vehicle-body and to varying lateral road-levels without overstraining the body-supporting springs and also permitting wear-compensating adjustment of the traction-wheel-driving mechanism.

17. In a motor-vehicle, the combination, with the vehicle-body, the traction-wheel axle, springs connecting said body and axle and having pivotal couplings intermediate their ends on which they may rock bodily, two driving-shafts and means independently rotating the two traction-wheels one from each driving-shaft, of parts loosely fitted at said axle and at each driving-shaft, and two reach-bars connected one at each side of the running-gear to said loose parts and permitting free vertical movements of either or both traction-wheels relatively to their driving-shafts and to the vehicle-body without overstraining the body-supporting springs.

18. In a motor-vehicle, the combination, with the vehicle-body, the traction-wheel axle, springs connecting said body and axle and having pivotal couplings intermediate their ends on which they may rock bodily, two driving-shafts and means independently rotating the two traction-wheels one from each driving-shaft, of parts loosely fitted at said axle and at each driving-shaft, and two swivel-jointed reach-bars coupled one at each side of the running-gear to said loose parts and permitting independent vertical movements of the traction-wheels relatively to their driving-shafts and the vehicle-body and to varying lateral road-levels without overstraining the body-supporting springs.

19. In a motor-vehicle, the combination, with the vehicle-body, the traction-wheel axle, springs connecting said body and axle and having pivotal couplings intermediate their ends on which they may rock bodily, two driving-shafts and means independently rotating the two traction-wheels one from each driving-shaft, of parts loosely fitted at said axle and at each driving-shaft, and two lengthwise-adjustable reach-bars connected one at each side of the running-gear to said loose parts and permitting free vertical movements of either or both traction-wheels relatively to their driving-shafts and to the vehicle-body without overstraining the body-supporting springs and also permitting wear-compensating adjustment of the traction-wheel-driving mechanism.

20. In a motor-vehicle, the combination, with the vehicle-body, the traction-wheel axle, springs connecting said body and axle and having pivotal couplings intermediate their ends on which they may rock bodily, two driving-shafts and means independently rotating the two traction-wheels one from each driving-shaft, of parts loosely fitted at said axle and at each driving-shaft, and two swivel-jointed and lengthwise-adjustable reach-bars connected to said loose parts and permitting independent vertical movements of the traction-wheels relatively to their driving-shafts and the vehicle-body and to varying lateral road-levels without overstraining the body-supporting springs and also permitting wear-compensating adjustment of the traction-wheel-driving mechanism.

21. In a motor-vehicle, the combination, with the vehicle-body, the traction-wheel axle, springs connecting said body and axle and having pivotal couplings intermediate their ends on which they may rock bodily, a driving-shaft, and means rotating the traction-wheels from said driving-shaft, of parts loosely fitted at said axle and shaft, and a reach-bar coupled to said loose parts by vertical pivots and permitting free vertical and lateral movements of the traction-wheel relatively to the driving-shaft and vehicle-body without overstraining the body-supporting springs.

22. In a motor-vehicle, the combination, with the vehicle-body, the traction-wheel axle, springs connecting said body and axle and having pivotal couplings intermediate their ends on which they may rock bodily, a driving-shaft, and means rotating the traction-wheel from said shaft, of parts loosely fitted at said axle and shaft, and a swivel-jointed reach-bar coupled to said loose parts by vertical pivots and permitting free vertical and lateral movements of the traction-wheel relatively to the driving-shaft and vehicle-body and to varying lateral road-levels without overstraining the body-supporting springs or the driving-gearing.

23. In a motor-vehicle, the combination, with the vehicle-body, the traction-wheel axle, springs connecting said body and axle and having pivotal couplings intermediate their ends on which they may rock bodily, a driving-shaft, and means rotating the traction-wheel from said shaft, of parts loosely fitted at said axle and shaft, and a lengthwise-adjustable reach-bar coupled to said loose parts by vertical pivots and permitting free vertical and lateral movements of the traction-wheel relatively to the driving-shaft and vehicle-body without overstraining the body-supporting springs and also permitting wear-compensating adjustment of the traction-wheel-driving mechanism.

24. In a motor-vehicle, the combination, with the vehicle-body, the traction-wheel axle, springs connecting said body and axle and having pivotal couplings intermediate their ends on which they may rock bodily, a driving-shaft, and means rotating the traction-wheel from said shaft, of parts loosely fitted at said axle and shaft, and a swivel-jointed and lengthwise-adjustable reach-bar coupled to said loose parts by vertical pivots and permitting free vertical and lateral movements of the traction-wheel relatively to the driving-shaft and to varying lateral road-levels without overstraining the body-supporting springs or the driving-gearing and also permitting wear-compensating adjustment of the traction-wheel-driving mechanism.

25. In a motor-vehicle, the combination, with the vehicle-body, the traction-wheel axle, springs connecting said body and axle and having pivotal couplings intermediate their ends on which they may rock bodily, two driving-shafts and means independently rotating the two traction-wheels one from each driving-shaft, of parts loosely fitted at said axle and at each driving-shaft, and two reach-bars coupled one at each side of the running-gear to said loose parts by vertical pivots and permitting free vertical and lateral movements of either or both traction-wheels relatively to their driving-shafts and to the vehicle-body without overstraining the body-supporting springs.

26. In a motor-vehicle, the combination, with the vehicle-body, the traction-wheel axle, springs connecting said body and axle and having pivotal couplings intermediate their ends on which they may rock bodily, two driving-shafts and means independently rotating the traction-wheels one from each driving-shaft, of parts loosely fitted at said axle and at each driving-shaft, and two swivel-jointed reach-bars coupled one at each side of the running-gear to said loose parts by vertical pivots and permitting free vertical and lateral movements of either or both traction-wheels relatively to their driving-shafts and to the vehicle-body and to varying lateral road-levels without overstraining the body-supporting springs or the driving-gearing.

27. In a motor-vehicle, the combination, with the vehicle-body, the traction-wheel axle, springs connecting said body and axle and having pivotal couplings intermediate their ends on which they may rock bodily, two driving-shafts and means independently rotating the two traction-wheels one from each driving-shaft, of parts loosely fitted at said axle and at each driving-shaft, and two lengthwise-adjustable reach-bars coupled one at each side of the running-gear to said loose parts by vertical pivots and permitting free vertical and lateral movements of either or both traction-wheels relatively to their driving-shafts and to the vehicle-body without overstraining the body-supporting springs and also permitting wear-compensating adjustment of the traction-wheel-driving mechanism.

28. In a motor-vehicle, the combination, with the vehicle-body, the traction-wheel axle, springs connecting said body and axle and having pivotal couplings intermediate their ends on which they may rock bodily, two driving-shafts and means independently rotating the traction-wheels one from each driving-shaft, of parts loosely fitted at said axle and at each driving-shaft, and two swivel-jointed and lengthwise-adjustable reach-bars coupled one at each side of the running-gear to said loose parts by vertical pivots and permitting free vertical and lateral movements of either or both traction-wheels relatively to their driving-shafts and to the vehicle-body and to varying lateral road-levels without overstraining the body-supporting springs or the driving-gearing and also permitting wear-compensating adjustment of the traction-wheel-driving mechanism.

29. In a motor-vehicle, the combination, with the axle and a traction-wheel thereon carrying a chain-wheel, a driving-shaft also carrying a chain-wheel, casings for said chain-wheels fitted revolubly at the axle and driving-shaft, and a chain belt connecting the two chain-wheels, of a reach-bar coupled to said wheel-casings by vertical pivots and permitting free vertical and lateral movements of the traction-wheel relatively to the driving-shaft and vehicle-body.

30. In a motor-vehicle, the combination, with the axle and a traction-wheel thereon carrying a chain-wheel, a driving-shaft also carrying a chain-wheel, casings for said chain-wheels fitted revolubly at the axle and driving-shaft, and a chain belt connecting the two chain-wheels, of a swivel-jointed reach-bar coupled to said wheel-casings by vertical pivots and permitting universal movements of the traction-wheel relatively to the driving-shaft, the vehicle-body, and varying lateral road-levels.

31. In a motor-vehicle, the combination, with the axle and a traction-wheel thereon carrying a chain-wheel, a driving-shaft also carrying a chain-wheel, casings for said chain-wheels fitted revolubly at the axle and driving-shaft, and a chain belt connecting the two chain-wheels, of a lengthwise-adjustable reach-bar coupled to said wheel-casings by vertical pivots and permitting free vertical and lateral movements of the traction-wheel relatively to the driving-shaft and vehicle-body and also permitting wear-compensating adjustment of the driving chain belt.

32. In a motor-vehicle, the combination, with the axle and a traction-wheel thereon carrying a chain-wheel, a driving-shaft also carrying a chain-wheel, casings for said chain-wheels fitted revolubly at the axle and driving-shaft, and a chain belt connecting the two chain-wheels, of a swivel-jointed and lengthwise-adjustable reach-bar coupled to said wheel-casings by vertical pivots and permitting universal movements of the traction-wheel relatively to the driving-shaft, the vehicle-body, and varying lateral road-levels, and also permitting wear-compensating adjustment of the driving chain belt.

33. In a motor-vehicle, the combination, with the axle and two traction-wheels thereon, two driving-shafts, a chain-wheel at each traction-wheel and driving-shaft, casings for said chain-wheels fitted revolubly at the axle and driving-shafts, and chain belts connecting the traction and driving-shaft wheels at each side of the running-gear, of two reach-bars coupled to the wheel-casings at each side of the running-gear by vertical pivots and permitting free vertical and lateral movements of the traction-wheels relatively to their driving-shafts and to the vehicle-body.

34. In a motor-vehicle, the combination, with the axle and two traction-wheels thereon, two driving-shafts, a chain-wheel at each traction-wheel and driving-shaft, casings for said chain-wheels fitted revolubly at the axle and driving-shafts, and chain belts connecting the traction and driving-shaft wheels at each side of the running-gear, of two swivel-jointed reach-bars coupled to the wheel-casings at each side of the running-gear by vertical pivots and permitting universal movements of the traction-wheels relatively to their driving-shafts, the vehicle-body, and varying lateral road-levels.

35. In a motor-vehicle, the combination, with the axle and two traction-wheels thereon, two driving-shafts, a chain-wheel at each traction-wheel and driving-shaft, casings for said chain-wheels fitted revolubly at the axle and driving-shafts, and chain belts connecting the traction and driving-shaft wheels at each side of the running-gear, of two lengthwise-adjustable reach-bars coupled to the wheel-casings at each side of the running-gear by vertical pivots and permitting free vertical and lateral movements of the traction-wheels relatively to their driving-shafts and the vehicle-body, and also permitting wear-compensating adjustments of the driving chain belts.

36. In a motor-vehicle, the combination, with the axle and two traction-wheels thereon, two driving-shafts, a chain-wheel at each traction-wheel and driving-shaft, casings for said chain-wheels fitted revolubly at the axle and driving-shafts, and chain belts connecting the traction and driving-shaft wheels at each side of the running-gear, of two swivel-jointed and lengthwise-adjustable reach-bars coupled to the wheel-casings at each side of the running-gear by vertical pivots and permitting universal movements of the traction-wheels relatively to their driving-shafts, the vehicle-body, and varying lateral road-levels, and also permitting wear-compensating adjustments of the driving chain belts.

37. In a motor-vehicle, the combination, with the vehicle-body, the traction-wheel axle, and adjustable means rotating the traction-wheels, of springs having upper and lower portions; said lower spring portions being fixedly clipped to the axle, and pivotal connections each comprising one part fixed to the upper portion of the springs and another part adjustably connected to the vehicle-body.

38. In a motor-vehicle, the combination, with the traction-wheel carrying an outer brake member and an inner driving-wheel, of a casing for said driving-wheel, a second brake member coöperating with the traction-wheel brake member, a shaft journaled in said driving-wheel casing and coupled at its outer end to the second brake member, and connections from the inner end of the shaft to an operating device controlled by the driver.

39. In a motor-vehicle, the combination, with the axle and two traction-wheels thereon, each traction-wheel carrying an outer brake member and an inner driving-wheel, of a casing for each driving-wheel, a second brake member coöperating with the brake member at each traction-wheel, a shaft journaled in each driving-wheel casing and coupled at its outer end to the adjacent traction-wheel brake member, and connections from the inner ends of both shafts to a device controlled by the driver and permitting simultaneous operation of the brakes at both traction-wheels.

40. In a motor-vehicle, the combination, with the traction-wheel carrying an outer brake member and an inner driving chain-wheel, a driving-shaft and a chain-wheel thereon, and a chain belt connecting the traction and driving-shaft chain-wheels, of a casing for the traction-wheel driving-wheel, a brake member on the traction-wheel outside of said casing, a second brake member coöperating with the traction-wheel brake member, a shaft journaled in said casing and passing within the bight of the driving-chain and connected to the second coöperating brake member, and connections from the inner end of said shaft to an operating device controlled by the driver.

41. In a motor-vehicle, the combination, with the road-wheel axle, of springs clipped at lower parts to the axle, plates 43 clipped to upper parts of the springs, supports as 45 having pivotal connection at 44 with the spring-plates 43, and means adjustably fastening said supports to the vehicle-body, substantially as described.

42. In a motor-vehicle, the combination, with the road-wheel axle, of springs clipped at lower parts to the axle, plates 43 clipped to upper parts of the springs, supports as 45 having pivotal connection at 44 with the spring-plates 43, and plates 47 held to the vehicle-body and carrying screws 46 adapted to move supports 45 for readjusting upper portions of the springs to maintain their normal elastic action, substantially as described.

43. In a motor-vehicle, the combination, with a driving-shaft having a wheel 32, of a casing 30 fitted revolubly on the shaft-bearing, the traction-wheel 36, a driving-wheel 50 on the traction-wheel, a chain belt 49 connecting wheels 32, 50, and a casing 53 for said wheel 50 fitted revolubly on the traction-wheel axle, of a reach-bar 57 having lengthwise-adjustable swivel-joint 59 and coupled by vertical pivots 58, 58, to wheel-casings 30, 53, a brake wheel or rim 52 on traction-wheel 36, a brake-band 75 surrounding wheel 52 and connected at one end to wheel-casing 53, a shaft 73 journaled in casing 53 and having an arm 74 connected to the other end of the brake-band and also having an arm 72, and connections from shaft-arm 72 to a brake-operating device controlled by the driver, substantially as described.

44. In a motor-vehicle, the combination, with two driving-shafts 26, 27, each having wheels 32, 33, means rotating wheels 33 and the shafts, casings 30 for wheels 32 fitted revolubly on the shaft-bearings, traction-wheels 36 having driving-wheels 50, chain belts 49 connecting the wheels 32, 50, and casings 53 for wheels 50 fitted revolubly on the traction-wheel axle, of two reach-bars 57 having lengthwise-adjustable swivel-joint 59 and coupled by vertical pivots 58, 58, to the wheel-casings 30, 53 at each side of the vehicle, a brake wheel or rim 52 on each traction-wheel, a brake-band 75 surrounding each wheel 52 and connected at one end to the wheel-casing 53, a shaft 73 journaled in each casing 53 and having an arm 74 connected to the other end of the adjacent brake-band, an arm 72 on each shaft 73, sleeves 68, 69, journaled at the driving-shaft and having pairs of arms 67, 70, rods 71 connecting arms 70, 72, and connections from the arms 67 of both sleeves 68, 69 to a brake-operating device controlled by the driver, substantially as described.

45. In a motor-vehicle, the combination, with the traction-wheels each carrying a driving-wheel and a brake-wheel 52, a driving-shaft, and means rotating the driving and traction wheels from said shaft, of casings 53 for the driving-wheels journaled on the traction-wheel axle, a shaft 73 journaled in each casing and carrying an inner arm 72 and an outer arm 74, brake-bands 75 surrounding the brake-wheels 52 and connected at one end to the casings 53 and at the other end to shaft-arms 74, two sleeves 68, 69 journaled at the driving-shaft and each having arms 70, 67, rods 71 connecting the adjacent arms 70, 72, a cross-bar 66 connecting the arms 67 of the two sleeves, a rod 65 coupled to bar 66, and connections from rod 65 to a brake-operating device controlled by the driver, substantially as described.

ARTHUR L. STEVENS.

Witnesses:
KENNETH H. SLOCUM,
A. J. DOTY.